United States Patent Office 3,042,626
Patented July 3, 1962

3,042,626
POLYMERIZATION CATALYST AND PROCESS
John MacMillan Bruce, Jr., Claymont, and Ivan Maxwell Robinson, Wilmington, Del., assignors to E. I. du Pont de Nemours and Company, Wilmington, Del., a corporation of Delaware
No Drawing. Filed May 21, 1956, Ser. No. 585,974
4 Claims. (Cl. 252—429)

This invention relates to the polymerization of ethylenically unsaturated hydrocarbons and especially to catalysts employed in such polymerizations.

It has recently been discovered that ethylene can be polymerized to high density, linear polymers at relatively low pressures by employing a catalyst system comprising a metal complex containing a transition metal in a reduced valence state. This complex is obtained by admixing a salt or alcoholate, but preferably a halide of a metal selected from metals forming groups IVb, Vb, and VIb of the periodic table of elements with a reducing agent. Reducing agents capable of reducing the transition metals to the catalytically active state are organometallic compounds such as metal alkyls and aryls, metal hydrides and certain active metals such as alkali metals. This type of catalyst has been referred to as a coordination catalyst, since it is believed that the polymerization of the ethylenically unsaturated monomer proceeds through the formation of a coordinate bond between the reduced metal in the complex and the monomer.

The objects of the present invention are to improve the efficiency and activity of polymerization catalysts obtained through the reduction of transition metal salts or alcoholates.

In accordance with the present invention a highly active catalyst system for the polymerization of terminally unsaturated hydrocarbon monomers to solid high molecular weight polymers has been discovered, which catalyst system comprises the product formed by admixing in a hydrocarbon diluent (1) a transition metal halide wherein the metal is an element of group IVb of the periodic table of elements with (2) an organometallic compound having the general formula $MR_n$ wherein M is an alkali or alkaline earth metal or aluminum, R a hydrocarbon radical and $n$ the number of metal to hydrocarbon bonds, and (3) a metal halide wherein the metal is a member of the class consisting of metals in groups IIIa, IVa, Va, and VIII of the periodic table.

The metal halides employed as activators in the present invention are, as stated above, the metal halides wherein the metal is selected from groups IIIa, IVa, Va and VIII of the periodic table of elements (Handbook of Chemistry and Physics, Chemical Rubber Publishing Co., 37th edition, page 392). The preferred metal halides are those of aluminum in group IIIa, those of lead and tin in group IVa, those of antimony and bismuth in group Va and those of iron, cobalt or nickel in group VIII. The halogens employed in the activator metal halides are preferably chlorine and bromine. The activator metal halides themselves do not cause the polymerization of ethylene to high molecular weight polymers. No significant polymerization occurs when these metal halides are admixed with metal alkyls or metal aryls. However, it was found that the metal halides, when added as a third component to a catalyst system formed by admixing group IVb transition metal halide with a metal alkyl or metal aryl, cause a significant increase in activity over the activity of a catalyst formed in the absence of the metal halide. It is believed that the metal halides take part in the reaction leading to the formation of the coordination catalyst, and thereby increase the activity of the catalyst.

The transition metal halides employed in the present invention are those of group IVb of the periodic table of elements and, as such, include the halides of titanium, zirconium and hafnium; of these the titanium halides are preferred. The halides included are chlorides, oxychlorides, bromides, iodides and fluorides; the latter two, however, being less preferred than the chlorides and bromides. Those halides which are soluble in hydrocarbon solvents in the quantities required for polymerization are particularly preferred, since with soluble halides the reduction to the catalytically active state is more readily achieved.

The reducing agents employed to form the catalyst of the present invention are metal alkyls or metal aryls. The metals employed in the metal alkyls and aryls are alkali metals, alkaline earth metals and metals of groups IIIa of the periodic table of elements. Thus, representative samples are aluminum trialkyls, lithium alkyls, magnesium diaryls and lithium aluminum tetraalkyls. The preparation of these compounds is known to those skilled in the art.

The catalysts of the present invention are compositions containing the transition metal compound in a reduced valence state. The reduced transition metal compound is believed to cause the polymerization of the terminally unsaturated hydrocarbon monomers that can be employed in the present invention. The catalyst is formed when the catalyst components are admixed. The reaction occurs rapidly at room temperatures, and also at elevated temperatures, and leads to the formation of a catalytically active complex which appears to be only slightly soluble in hydrocarbon solvents. The reaction is preferably carried out in a liquid diluent to obtain the catalyst in dispersed form, which is better suited for polymerization. Hydrocarbon solvents that are also polymerization media are preferred. Where the monomer to be polymerized is a liquid, the monomer may serve as the diluent. Although the catalyst may be stored in the hydrocarbon medium or may be separated from the solvent, it is preferred to form the catalyst just prior to use or in the presence of the monomer to be polymerized because the relative instability of the catalyst as compared to that of the catalyst components makes storage uneconomical. The order in which the three catalyst components are admixed is of minor significance, although it is preferred to add the activator prior to or simultaneously with the reducing agent. The components are preferably admixed in the form of solutions in hydrocarbon solvents, although highly active catalysts have also been obtained with dispersions of the activator metal halide.

The ratio of the metal alkyl or metal aryl to the transition metal halide may be varied over a wide range, but should be sufficient to reduce at least part of the transition metal halide to a valence state below three. In general, the highest activity of the catalyst system is found in a reducing agent to transition metal halide molar ratio of 0.3 to 10. The quantity of the activator metal halide is not critical. In general, equimolar quantities of the transition metal halide are highly satisfactory to achieve the formation of the catalysts of the present invention. Excess quantities of the activator metal halide do not adversely affect the formation of the catalyst, nor do they adversely affect the polymerization of the monomer.

The quantity of the active catalyst necessary to achieve optimum polymerization rates will vary with the conditions employed. In general, the quantities employed vary from 0.001 to 10% by weight of the monomer.

The extreme activity of the catalyst makes a versatile polymerization process possible. Generally, the polymerization is carried out in the presence of a diluent. Suitable diluents are inert hydrocarbon solvents, such as cyclohexane, decane, xylene and toluene, or where the monomer is liquid, the monomer may be used as the polymerization medium. The reaction temperature may be varied from below 0° to temperatures above 250° C. Preferably the temperature is sufficiently high enough to maintain the polymer in solution, e.g., temperatures above 100° C. Pressures used when employing a gaseous monomer may vary from atmospheric pressures to pressures above 1000 atmospheres; however, for practical reasons, a pressure of 1 to 200 atmospheres may be preferred. The process of the present invention may be carried out in batch or continuous operation.

The activity of the catalysts of the present invention is further illustrated by the following examples.

*Example I*

Into a 500 ml. flask equipped with stirrer, condenser and gas inlet and gas outlet means was charged under an atmosphere of ethylene 100 ml. of decahydronaphthalene. The solvent was heated to 100° C. and agitated to obtain a saturated solution of ethylene in the solvent. A solution of 32 micromoles titanium tetrachloride in decahydronaphthalene was then injected. This was followed by the injection of 32 micromoles of aluminum tribromide dissolved in a small quantity of decahydronaphthalene and the injection of 51 micromoles of lithium aluminum tetraheptyl. On injection of the lithium aluminum tetraheptyl a dispersed dark precipitate formed and ethylene was immediately adsorbed at the rate of 30 $cm.^3$/min. The polymerization was continued for 120 minutes in which period a total of 1105 $cm.^3$ of ethylene was adsorbed. During the polymerization run, temperature and pressure were maintained. The reaction mixture was cooled to room temperature and poured into excess methanol, causing the polymer to precipitate. On filtering, washing and drying there was obtained 1.32 g. of solid polymer. The polymer could be molded into tough cold drawable films.

The polymerization run was repeated under identical conditions, except no aluminum tribromide was added to the reaction mixture. On addition of the lithium aluminum tetraheptyl, a dark precipitate formed and ethylene was adsorbed at the rate of 19 $cm.^3$/min. After 120 minutes a total of 465 $cm.^3$ had been adsorbed. The polymer obtained on washing and drying weighed 0.55 g. and was essentially the same as described above.

*Example II*

Employing the procedure described in Example I ethylene was polymerized, employing a catalyst formed from 32 micromoles of titanium tetrachloride, 31 micromoles of tin tetrachloride and 164 micromoles of diphenyl magnesium which contained a minor quantity of phenyl-magnesium chloride impurity. The initial rate of polymerization was 57 $cm.^3$/min. and after 120 minutes a total of 2300 $cm.^3$ of ethylene at atmospheric pressure had been adsorbed by the reaction mixture. On recovering the polymer from the reaction mixture there was isolated 2.80 g. of high molecular weight solid polymer of ethylene.

The run was repeated without the use of the tin tetrachloride. The initial rate of ethylene adsorption was 43 $cm.^3$/min. and a total of 1620 $cm.^3$ of ethylene was polymerized in 120 minutes. From the reaction mixture there was isolated 1.95 g. of solid polymer. The polymer was of high molecular weight.

*Example III*

Employing the procedure described in Example I, ethylene was polymerized, employing a catalyst formed from 32 micromoles of titanium tetrachloride, 32 micromoles of antimony pentachloride and 173 mircromoles of diphenyl magnesium containing a minor amount of phenyl magnesium chloride as impurity. The initial rate of polymerization was 50 $cm.^3$/min. and after 120 minutes a total of 2050 $cm.^3$ of ethylene at atmospheric pressure had been adsorbed by the reaction mixture. On recovering the polymer from the reaction mixture there was isolated 2.5 g. of solid polymer of ethylene that could be molded into tough, cold drawable films. In the absence of the antimony pentachloride under identical conditions, 1620 $cm.^3$ of ethylene is polymerized, giving rise to 1.95 g. of polymer.

*Example IV*

Employing the procedure described in Example I, ethylene was polymerized, employing a catalyst formed from 32 mircromoles of titanium tetrachloride, 16 micromoles of ferric chloride, which was added to the reaction mixture in the form of a dispersion in cyclohexane and 64 micromoles of diphenyl magnesium. The initial rate of polymerization was 50 $cm.^3$/min. and after 120 minutes a total of 1900 $cm.^3$ of ethylene at atmospheric pressure had been adsorbed by the reaction mixture. On recovering the polymer from the reaction mixture there was isolated 2.28 g. of polymer that could be molded into tough, cold-drawable films. In the absence of the ferric chloride and under otherwise indentical conditions, 1520 $cm.^3$ of ethylene is polymerized, giving rise to 1.18 g. of polymer.

*Example V*

Employing the procedure described in Example I, ethylene was polymerized, employing a catalyst formed from 32 micromoles of titanium tetrachloride, 16 micromoles of cobaltous chloride, which was added to the reaction mixture in the form of a dispersion in cyclohexane and 64 micromoles of diphenyl magnesium. The initial rate of polymerization was 42 $cm.^3$/min. and after 120 minutes a total of 1750 $cm.^3$ of ethylene at atmospheric pressure had been adsorbed by the reaction mixture. On recovering the polymer from the reaction mixture there was isolated 2.20 g. of polymer that could be molded into tough, cold-drawable films. In the absence of the cobalt chloride and under otherwise identical conditions, 1520 $cm.^3$ of ethylene is polymerized, giving rise to 1.18 g. of polymer.

*Example VI*

Into a 2 liter reaction vessel equipped with stirrer, reflux condenser, gas inlet and outlet means was charged under an atmosphere of nitrogen 1 l. of cyclohexane containing 0.0045 mole of titanium tetrachloride and 0.0045 mole of tin tetrachloride. The nitrogen was replaced with propylene and agitated until a saturated solution of propylene was obtained. The polymerization was initiated by the injection of 0.0018 mole of lithium aluminum tetraheptyl. The polymerization was continued for 4 hours, maintaining the temperature at about 25° C. and the pressure at 1 atmosphere. The polymer was precipitated with methanol, filtered, washed and dried. A solid polymer of propylene weighing 18 g. and having a melt index of 0.022 (ASTM–1238–52T) was obtained. The addition of the tin tetrachloride to the catalyst system gave rise to high yields at low catalyst concentrations otherwise not obtainable.

*Example VII*

Employing the procedure described in Example I, ethylene was polymerized, employing a catalyst formed from 32 micromoles of titanium tetrachloride, 32 micromoles of tin tetrachloride and 70 micromoles of lithium aluminum tetraheptyl. The initial rate of polymerization was 49 $cm.^3$/min. and after 120 minutes a total of 1960 $cm.^3$ of ethylene at atmospheric pressure had been adsorbed by the reaction mixture. On recovering the polymer from the reaction mixture there was isolated 2.45 g. of solid polymer of ethylene that could be molded into tough, cold drawable films. In the absence of the tin tetrachloride under otherwise identical conditions 1100 $cm.^3$ of ethylene is polymerized giving rise to 1.2 g. of polymer.

The foregoing examples have illustrated the activating effect of metal halides in which the metals are selected from groups III*a*, IV*a*, V*a* and VIII. It is to be understood that the foregoing examples are illustrative only and that numerous embodiments will occur to those skilled in the art. The major advantage of the catalysts of the present invention is the increase in catalytic activity, resulting in higher polymer yields. Since the activator halides are relatively lower in cost as compared to the transition metal halides and the organometallic reducing agents, it is possible to lower the cost of polymer production by employing the catalysts of the present invention.

The catalysts of the present invention may be employed in the polymerization of ethylene or other terminally unsaturated olefins such as propylene and homologs thereof. The polymers of ethylene and terminally unsaturated hydrocarbons have a large number of applications, including molded articles, films and fibers.

We claim:

1. A catalyst composition for use in the polymerization of ethylenically unsaturated hydrocarbons consisting essentially of the product formed by admixing in the presence of a liquid hydrocarbon diluent (1) a titanium tetrahalide, (2) a tin halide, and (3) an organometallic compound selected from the class consisting of lithium aluminum tetraalkyls and magnesium diaryls, said organometallic compound being employed in molar proportions to the titanium tetrahalide varying from 0.3 to 10, and said tin halide being employed in amounts sufficient to increase polymerization rates.

2. The catalyst composition of claim 1 wherein the titanium tetrahalide is titanium tetrachloride.

3. The catalyst composition of claim 1 wherein the organometallic compound is a magnesium diaryl.

4. The catalyst composition of claim 1 wherein the organometallic compound is lithium aluminum tetraheptyl.

References Cited in the file of this patent

UNITED STATES PATENTS

| | | |
|---|---|---|
| 2,287,244 | Heinman | June 23, 1942 |
| 2,416,931 | Lecher | Mar. 4, 1947 |
| 2,428,455 | Freidman | Oct. 7, 1947 |
| 2,491,116 | Kraus et al. | Dec. 13, 1949 |
| 2,524,771 | Darling | Oct. 10, 1950 |
| 2,725,374 | Mosher | Nov. 29, 1955 |
| 2,727,024 | Field | Dec. 13, 1955 |
| 2,905,645 | Anderson et al. | Sept. 22, 1959 |
| 2,959,579 | Reed et al. | Nov. 8, 1960 |

FOREIGN PATENTS

| | | |
|---|---|---|
| 534,792 | Belgium | Jan. 31, 1955 |
| 543,941 | Belgium | Dec. 24, 1955 |
| 785,314 | Great Britain | Oct. 23, 1957 |

OTHER REFERENCES

Ziefiler: "Annalen," BD 589 (1954), pp. 91–121, pp. 94 and 97 only needed.